US012375616B2

(12) United States Patent
Castillo-Garza et al.

(10) Patent No.: US 12,375,616 B2
(45) Date of Patent: Jul. 29, 2025

(54) DISCREET INTRA-AIRCRAFT COMMUNICATION

(71) Applicant: B/E AEROSPACE, INC., Winston Salem, NC (US)

(72) Inventors: Jose-Rodrigo Castillo-Garza, West Hartford, CT (US); Brigid A. Blakeslee, Hamden, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 197 days.

(21) Appl. No.: 17/857,823

(22) Filed: Jul. 5, 2022

(65) Prior Publication Data

US 2024/0010341 A1    Jan. 11, 2024

(51) Int. Cl.
*H04N 1/32* (2006.01)
*H04N 1/00* (2006.01)
*H04N 101/00* (2006.01)
*B64D 11/00* (2006.01)

(52) U.S. Cl.
CPC ..... *H04N 1/32144* (2013.01); *H04N 1/00122* (2013.01); *B64D 11/00155* (2014.12); *H04N 2101/00* (2013.01); *H04N 2201/3245* (2013.01); *H04N 2201/3266* (2013.01)

(58) Field of Classification Search
CPC ........... H04N 1/32144; H04N 1/00122; H04N 2101/00; H04N 2201/3245; H04N 2201/3266; H04N 19/467; G06F 21/84; G06F 21/6245; H04L 63/0428; G06T 19/006; B64D 11/00155
See application file for complete search history.

(56) References Cited

U.S. PATENT DOCUMENTS

| 7,209,557 | B2 | 4/2007 | Lahiri | |
|---|---|---|---|---|
| 9,830,474 | B2 * | 11/2017 | Anantapur Bache | .... G09C 5/00 |
| 11,025,892 | B1 | 6/2021 | Aman et al. | |
| 11,308,572 | B1 * | 4/2022 | Benkual | ......... G06T 1/005 |
| 11,822,698 | B2 * | 11/2023 | Ananthanarayanan | ...... G06F 21/6245 |
| 2007/0024527 | A1 * | 2/2007 | Heikkinen | .............. A63F 13/65 345/9 |

(Continued)

FOREIGN PATENT DOCUMENTS

CN    112669790    4/2021

OTHER PUBLICATIONS

European Patent Office, European Search Report dated Oct. 11, 2023 in Application No. 23183352.6.

(Continued)

*Primary Examiner* — Twyler L Haskins
*Assistant Examiner* — John H Morehead, III
(74) *Attorney, Agent, or Firm* — SNELL & WILMER L.L.P.

(57) ABSTRACT

A method is disclosed herein, including detecting, by a processor, a signal received from a camera, the signal including an image. The method further includes processing, by the processor, the received signal to identify an image included in the signal and determining, by the processor, that the signal includes a discreet message, the discreet message is embedded within an image. The method further includes decrypting, by the processor, the discreet message embedded within the signal and sending, by the processor, the decrypted message to be displayed.

17 Claims, 6 Drawing Sheets

(56) References Cited

U.S. PATENT DOCUMENTS

| | | | |
|---|---|---|---|
| 2014/0299660 A1* | 10/2014 | Melzer ............... | G02B 27/0172 235/375 |
| 2016/0246970 A1 | 8/2016 | Otero | |
| 2017/0091490 A1 | 3/2017 | Cameron | |
| 2017/0124349 A1* | 5/2017 | Anantapur Bache ... | G06F 21/44 |
| 2022/0067219 A1* | 3/2022 | Robinson ................ | G06F 21/84 |
| 2022/0414264 A1* | 12/2022 | Ananthanarayanan ....................... | G16Y 40/50 |

OTHER PUBLICATIONS

European Patent Office, European Office Action dated Aug. 7, 2024 in Application No. 23183352.6.

* cited by examiner

DISCREET INTRA-AIRCRAFT COMMUNICATION

FIELD

The present disclosure generally relates to communication on an airplane, and more specifically to discreet communication methods on an airplane.

BACKGROUND

Flight crews often rely on intercom systems and telephones throughout the aircraft for communication with each other. Flight crews also rely on call buttons near each passenger seat to know when a passenger requests attention. There does not exist a means for discreet communication in certain hazardous or crisis scenarios without potentially calling attention to or alarming passengers. Similarly, there does not exist a discreet way for passengers to communicate with flight crew without alerting neighboring passengers.

SUMMARY

A method is disclosed herein, including detecting, by a processor, a signal received from a camera, the signal including an image. The method further includes processing, by the processor, the received signal to identify an image included in the signal and determining, by the processor, that the signal includes a discreet message, the discreet message is embedded within an image. The method further includes decrypting, by the processor, the discreet message embedded within the signal and sending, by the processor, the decrypted message to be displayed.

In various embodiments, the received signal from the camera includes video. In various embodiments, the discreet message is steganographically encrypted in the image. In various embodiments, the discreet message is encrypted in the image with non-visible light. In various embodiments, the method further includes identifying, by the processor, a key frame indicating the presence of a discreet message. In various embodiments, the method further includes identifying, by the processor, a recipient device for the discreet message and sending, by the processor, the discreet message to the identified recipient device. In various embodiments, the discreet message is embedded in image using turned off pixels.

Also disclosed herein is a system for discreet communication. The system includes a camera, a display, a processor, and a memory coupled to the processor. The memory includes instructions that when executed by the processor cause the processor to receive a signal from the camera, the signal including an image, process the signal from the camera to determine the presence of an image, and determine that there is a discreet message embedded in the signal, the discreet message is embedded in the image, the discreet message is embedded in the video. The instructions further cause the processor to decrypt the discreet message from the signal in response to the determination that the discreet message is present in the signal and display the decrypted discreet message on the display.

In various embodiments, the signal further includes a video. In various embodiments, the instructions when executed by the processor further cause the processor to determine the discreet message is embedded using steganography. In various embodiments, the instructions when executed by the processor further cause the processor to determine the discreet message is embedded using non-visible wavelengths of light. In various embodiments, the display is a crew display. In various embodiments, the display is one of a watch, a phone, a tablet, and an augmented reality glasses. In various embodiments, the instructions when executed by the processor further cause the processor to determine a second display for displaying the decrypted discreet message and send the decrypted discreet message to the second display. In various embodiments, the discreet message includes biometric data including at least one of a temperature, a heart rate, and passenger state of consciousness. the discreet message includes personalized information for a passenger.

Also disclosed herein is a method including receiving, by a processor, a message to display in an aircraft and encrypting, by the processor, the message for display. The method further includes sending, by the processor, a signal including the encrypted message, the signal is sent to a display in the aircraft. In various embodiments, the encrypting the message includes steganographically encrypting the message. In various embodiments, the method further includes determining, by the processor, the display to which the signal is sent. In various embodiments, the method further includes identifying, by the processor, a recipient device on the aircraft to which the encrypted message is sent.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As aircraft become more advanced, more displays and display systems are integrated throughout the interior of the aircraft. The present disclosure intends to leverage these integrated display systems throughout the aircraft to display discreet messages visible to flight crew and authorities. Also described herein, are systems and methods for displaying discreet messages to individual passengers, flight crew members, and authorities. The information may be embedded and encrypted in visible-to-all images displayed on the integrated display systems. This enables discreet communication between flight crew members, flight crew and authorities, and passengers and cabin crew. To embed and encrypt information, steganography-like methods are used. To extract information from displays, flight crew/authorities may wear augmented reality (AR) type glasses that are coupled with display systems. In various embodiments, embedded processors in AR type glasses decrypts the information. In various embodiments, the AR type glasses may further include a camera that initially view the encrypted message. In various embodiments, the AR type glasses may receive a decrypted message form an external system. In addition or in the alternative, surveillance cameras already installed throughout the aircraft could also be used in place of cameras in glasses.

Figure 1:
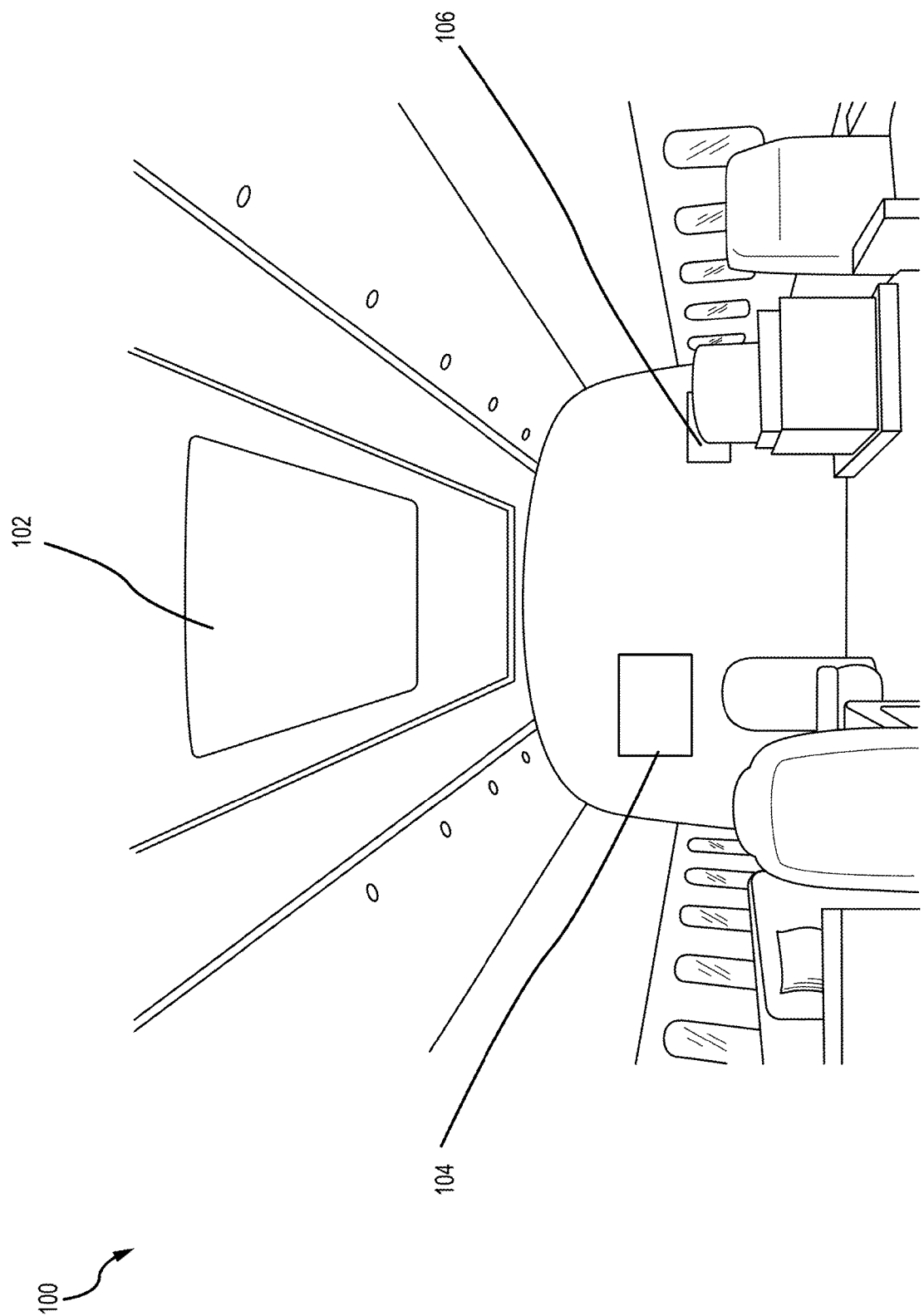
FIG. 1 illustrates an interior of an aircraft, in accordance with various embodiments.

Referring now to FIG. 1, in accordance with various embodiments, an aircraft interior 100 for displaying discreet messages is illustrated. Aircraft interior 100 includes an overhead display 102, a wall mounted display 104, and a seat back display 106. In various embodiments, one or more of overhead display 102, wall mounted display 104, and/or seat back display 106 may not be present. In various embodiments, there may be more than one of overhead display 102, wall mounted display 104, and/or seat back display 106. It will be appreciated that any number of displays may be present and integrated throughout the aircraft interior 100.

Additionally, aircraft interior 100 may include one or more surveillance cameras. Generally, aircraft include one or more surveillance cameras for safety and security purposes. These cameras may be used by the pilots and crew members to view all areas of the aircraft interior 100. For example, cameras may be placed outside the cockpit so that pilots are aware of what is going on outside of the cockpit door. Additionally, cameras may be placed through the aircraft interior 100 so that crew members can see areas within the aircraft interior 100 that might otherwise be obstructed from view when in their seats.

Figure 6B:
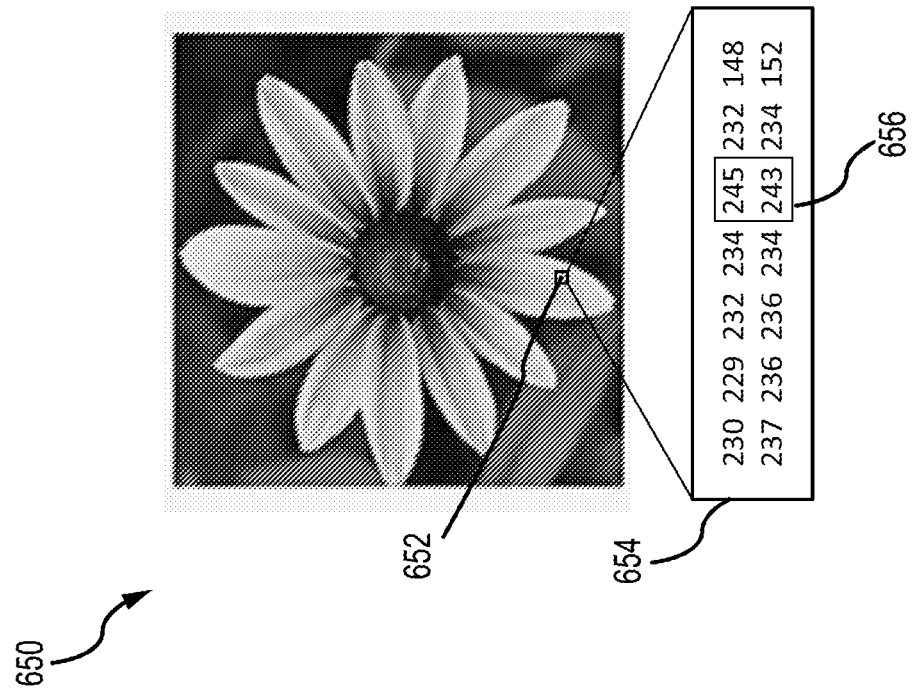
FIGS. 6A and 6B illustrate an image and an encoded image for displaying discreet communications, in accordance with various embodiments.
Figure 6A:
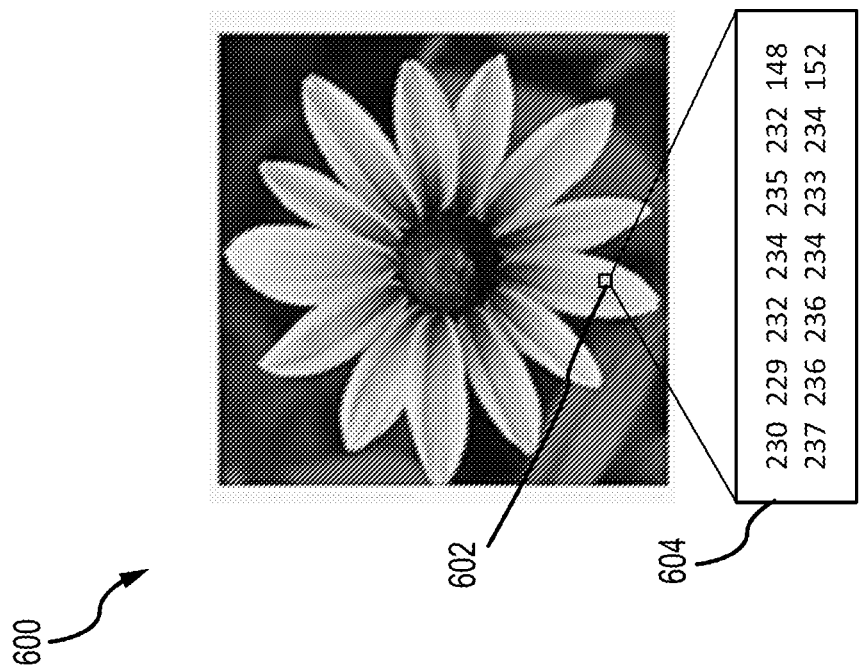

The displays and integrated display systems located throughout aircraft interior 100 may be used to display discreet, embedded messages. The messages may be encrypted using steganographic techniques so that passengers cannot see the messages. This provides a robust communication channel for flight crews allowing for discreet notifications during a hazardous or emergency situations. For example, a discreet message may be displayed in case of a medical emergency, harassment of a passenger or crew member, and/or other suspicious behavior. The discreet message may be displayed on one or more screens throughout the aircraft interior 100. Overhead display 102 may provide an improved view of any discreet message that is displayed, allowing the discreet message to be seen from anywhere within the aircraft interior 100. However, any display (e.g., wall mounted display 104 and seat back display 106) may display a discreet message. By displaying the message discreetly in this manner, passengers further away from the situation are not disturbed and/or frightened by the situation. For example, referring to FIG. 6A, an image 600 is illustrated including a portion 602 of image 600. Portion 602 is defined by a pixel array 604. Referring to FIG. 6B, an encoded image 650 is illustrated that looks similar to image 600. Encoded image 650 includes a portion 652, where portion 652 is in the same position as portion 602 of image 600. Portion 652 is defined by a pixel array 654. In this example, encoded image 650 includes adjusted pixels 656, which provides the discreet message encoding for encoded image 650. In various embodiments, adjusted pixels 656 may be set to 0, appearing as a dead, or turned off, pixel. In various embodiments, adjusted pixels 656 may emit non-visible light. Non-visible light may appear as a dead, or turned off, pixel.

The discreet messages may be visible to crew members or law enforcement wearing special glasses, such as augmented reality glasses that may include a camera and a display, as will be described further below. In various embodiments, crew members may utilize the cameras in the aircraft interior to see the discreet messages with the messages being decoded and displayed on a crew member display. In various embodiments, the discreet message may be seen by the interior cameras and decrypted to be sent to augmented reality glasses worn by crew members and/or law enforcement.

Figure 2:
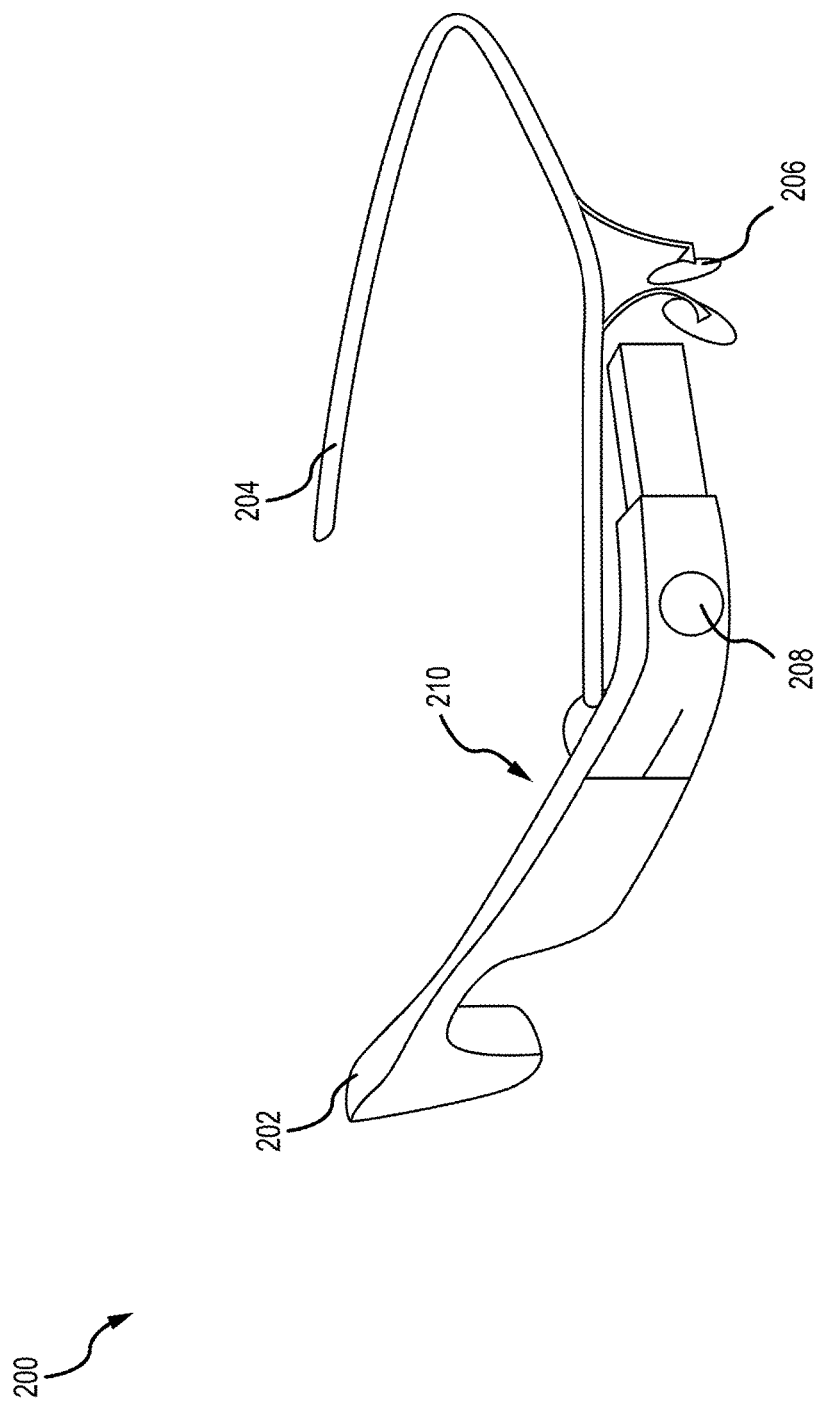
FIG. 2 illustrates augmented reality glasses, in accordance with various embodiments.

Referring now to FIG. 2, in accordance with various embodiments, a pair of augmented reality glasses 200 for displaying discreet messages is illustrated. Augmented reality glasses 200 include a frame 202, a temple piece 204, and an ear pad 206. In various embodiments, there may be two temple pieces 204, one for each side of the head. In various embodiments, ear pad 206 may be removed. Augmented reality glasses 200 further include a camera 208 and a screen 210 mounted on frame 202. As illustrated, camera 208 is forward facing (e.g., the negative y-direction) and screen 210 is rear facing (e.g., the y-direction).

Flight crew members may wear augmented reality glasses 200 during the normal course of a flight to improve the quality of service of the passengers. For example, the augmented reality glasses 200 may display an icon over the passenger that pressed a call button, enabling the crew member to more quickly attend to the request. As another example, the augmented reality glasses 200 may provide additional information about a specific passenger to the flight crew, such as identifying unaccompanied minors or those with special health concerns. With the augmented reality glasses 200, or similar glasses including a screen and/or camera, crew members may be able to see discreet messages displayed on any display within aircraft interior 100. In various embodiments, crew members may be able to see discreet messages sent directly to the augmented reality glasses 200. In various embodiments, the discreet message may be accompanied by a visual indication (e.g., an arrow) over the passenger, or seat, sending the message.

Figure 3:
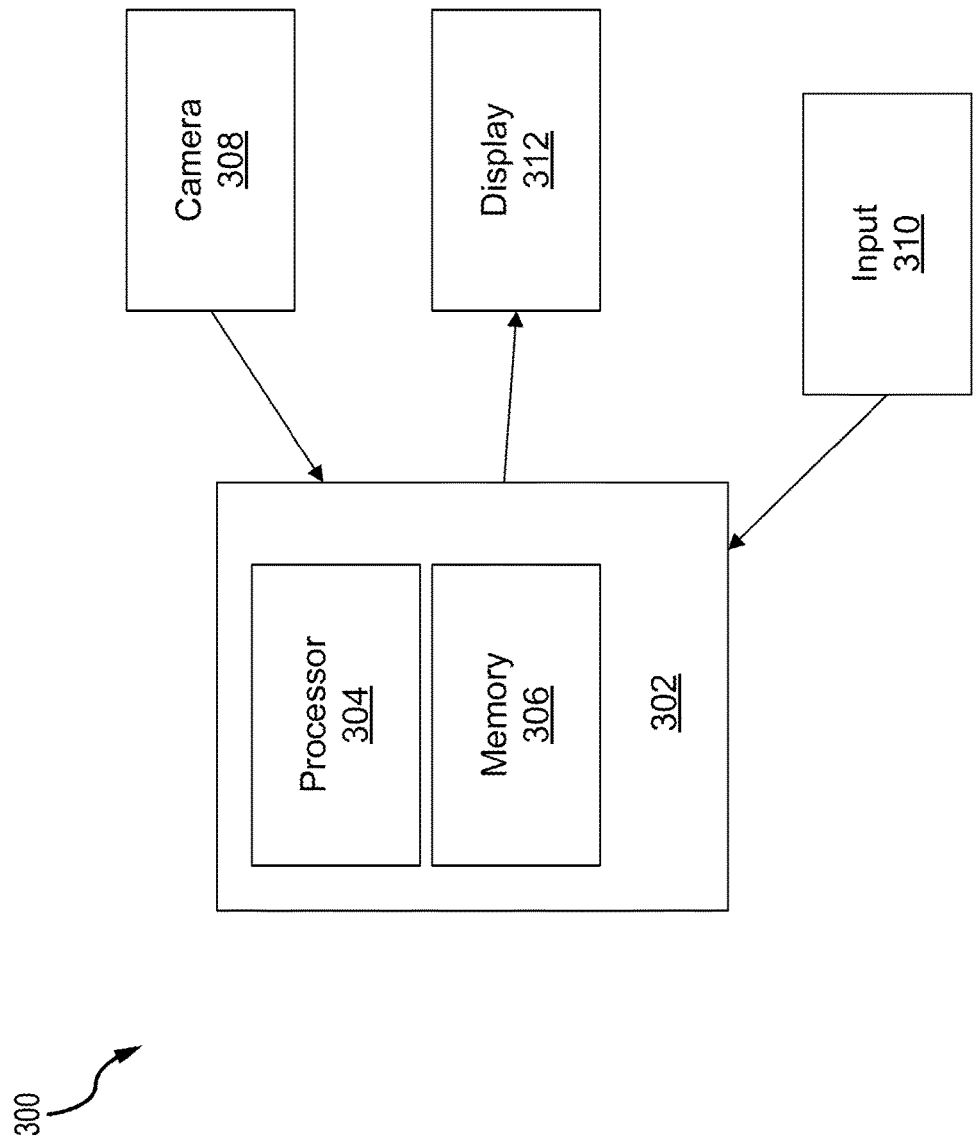
FIG. 3 illustrates a system architecture for encoding and decoding discreet communications, in accordance with various embodiments.

Referring now to FIG. 3, in accordance with various embodiments, a system architecture 300 for identifying and displaying discreet messages is illustrated. System architecture 300 includes an encoder/decoder unit 302 having a processor 304 and memory 306. Processor 304 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Memory 306 may comprise memory to store data, executable instructions, system program instructions, and/or controller instructions to implement the control logic of processor 304. In various embodiments, there may be more than one encoder/decoder unit 302. Each encoder/decoder unit 302 may implement the encoder, the decoder, or both encoder and decoder.

System architecture 300 may further include a camera 308, an input device 310, and a display 312. In various embodiments, camera 308 may be an implementation of camera 208 described above with respect to FIG. 2. In various embodiments, there may be more than one camera 308 throughout aircraft interior 100, including camera 208 and/or surveillance cameras. As described above, there may be more than on display 312. Display 312 may be an implementation of overhead display 102, wall mounted display 104, and/or seat back display 106. In various embodiments, display 312 may be a crew member display located in the galley, the cockpit, and/or crew quarters.

Input device 310 may any number of devices. For example, the cockpit may include an input device 310, such as a computer, for example, for sending messages to the crew members. In various embodiments, input device 310 may be a smart phone, a watch, a tablet, a controller, and/or a computer. In various embodiments, passengers may use an inflight entertainment system as input device 310. It will be appreciated that any number of devices may be input device 310, all of which are within the scope of this disclosure. For example, the input may be a medical emergency, harassment of a passenger or crew member, and/or other suspicious behavior. In various embodiments, the input may be sent automatically in response to biometric data such as temperature, heart rate, and/or passenger state of consciousness. The biometric data may be collected from camera 308 or input device 310. In various embodiments, input device 310 may further be a medical device worn by a passenger.

During an encoding process, encoder/decoder unit 302 receives a message from input device 310 for display. Processor 304 performs an encoding, or encryption, process to transform the message to a discreet message. In various embodiments, the encoding process may be a steganography process. Steganography is a process of embedding a message within a text, an image, a video, audio, or network data, among others. For example, the message may be encoded by adjusting every hundredth pixel of an image to correspond to a letter of the alphabet. For example, adjusted pixels 656 of encoded image 650 depicted in FIG. 6B. In various embodiments, the adjusted pixel may be turned off and may appear to be a dead pixel. Such an adjustment may not be recognized during the normal course of an activity, such as a flight. This method may also be used with a video being played on an aircraft.

In various embodiments, the encoding process may use non-visible wavelengths of light generated by one or more displays within aircraft interior 100. The non-visible light, such as for example, infrared light, would not be detectable by a human observer. Various cameras, including some smart phone cameras and security cameras, are able to detect non-visible wavelengths. Similar to steganography, the display may output a image or video along with the non-visible wavelengths of light to provide a discreet message to crew members, law enforcement, and/or passengers. For example, instead of adjusting a pixel or having a turned off pixel, a pixel may emit non-visible light, which may appear as a dead pixel to an observer. After encoding the message, encoder/decoder unit 302 transmits the encoded message to display 312.

During a decoding process, encoder/decoder unit 302 receives a signal from camera 308. The signal from camera 308 includes images from a display, such as display 312, within aircraft interior 100. Processor 304 analyzes the signal from camera 308 to determine whether an encoded, or encrypted, message is included in the signal. Processor 304 continues analyzing the signal until an encoded message is found. In various embodiments, an encoded message may follow a key frame, or indicator frame, that provides a signal to processor 304 that an encoded message is present. In various embodiments, an encoded message may include a series of pixels in specific location in an image to identify the image as including an encoded message.

Processor 304 then decodes the message in response to identifying the encoded message. The decoding process is the reverse of the encoding process described above. For example, processor 304 may read every hundredth pixel as being a letter of the alphabet. After decoding the message, processor 304 sends the decoded message to display 312. In various embodiments, display 312 may be special glasses, such as augmented reality glasses 200 described above with respect to FIG. 2. In various embodiments, display 312 may be a display in the galley or crew quarter accessible by the crew. In various embodiments, display 312 may be seat back display 106 when the message is targeted at a passenger.

Figure 4:
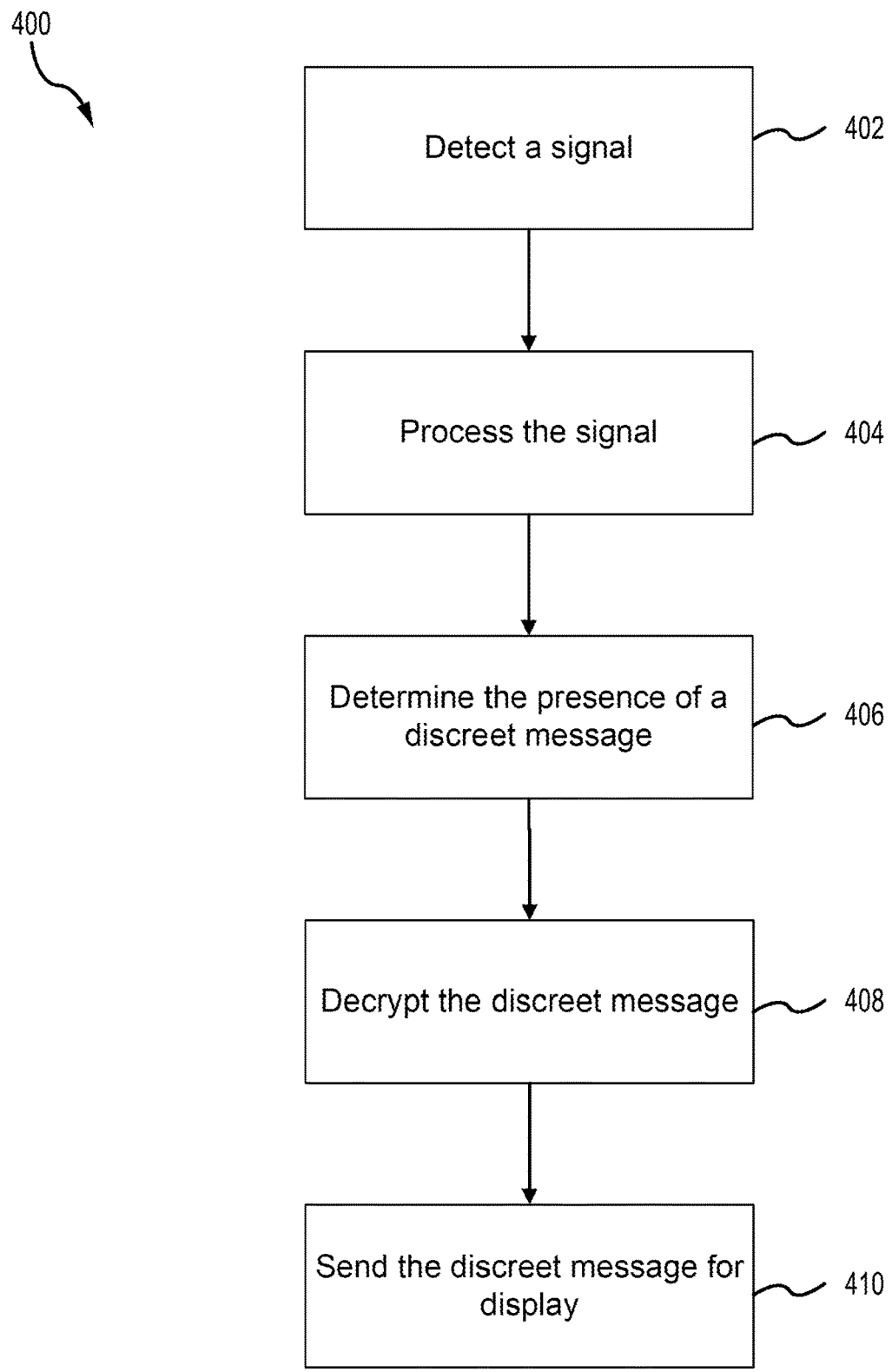
FIG. 4 illustrates a flow diagram for decoding and displaying discreet communications on board an aircraft, in accordance with various embodiments.

Referring now to FIG. 4, in accordance with various embodiments, a method 400 for encrypting discreet messages for use in intra-aircraft communication is illustrated. Method 400 may be performed by processor 304 of encoder/decoder unit 302.

At block 402, processor 304 detects a signal. The signal may be received from camera 308. In various embodiments, the signal may be received as a network signal from another device, such as augmented reality glasses 200. In various embodiments, the network signal may be WIFI, Bluetooth, or another wireless communication protocol.

At block 404, processor 304 processes the signal. Processing the signal may include searching for indicators that a discreet message is encoded, or embedded, in the signal. Such indicators may include a key frame or a set of pixels in a specific pattern, among others. Processor 304 continues processing the signal as it is received.

At block 406, processor 304 determines the presences of a discreet message in the signal. This may be through the key frame or set of pixels mentioned above. In various embodiments, processor 304 may determine the presence of a discreet message in response to identifying non-visible wavelengths of light.

At block 408, processor 304 decrypts the discreet message from the signal. In various embodiments, processor 304 may decode the discreet message using steganographic techniques. In various embodiments, processor 304 may decode non-visible wavelengths of light using a technique corresponding to the encoding technique.

At block 410, processor 304 sends the decoded discreet message to a display. In various embodiments, the display may be augmented reality glasses 200. In various embodiments, the display may be a crew display.

Figure 5:
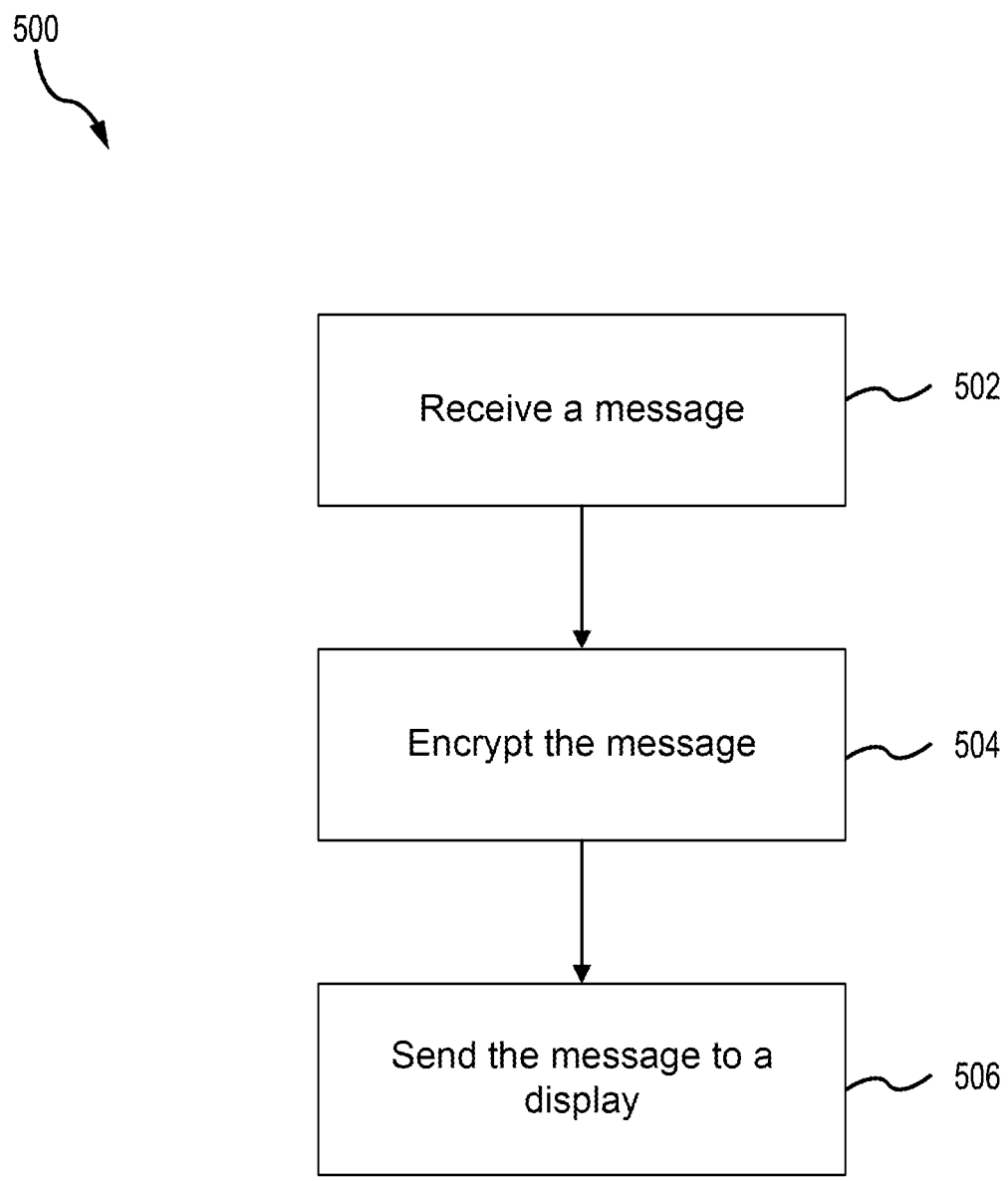
FIG. 5 illustrates a flow diagram for receiving and encoding discreet communications on board an aircraft, in accordance with various embodiments.

Referring now to FIG. 5, in accordance with various embodiments, a method 500 for decrypting discreet messages for use in intra-aircraft communication is illustrated. Method 500 may be performed by processor 304 of encoder/decoder unit 302.

At block 502, processor 304 receives a message. Processor 304 may receive the message from a user input such as a phone, a tablet, a computer, or entertainment display, among others. The message may be marked to be sent to a specific display or to all displays.

At block 504, processor 304 encrypts the message. The message may be encrypted, or encoded, using steganographic techniques such as modulation every hundredth pixel as previously described. In various embodiments, other known steganographic techniques may be used to encode the message. In various embodiments, the message may be encoded to be displayed using non-visible wavelengths of light. In various embodiments, a visible message (e.g., a QR code) may be used. In various embodiments, other symmetric and asymmetric encryption methods may be used such that a cryptographic key pair may be used to ensure security of the message and/or verify authenticity of the message.

At block 506, processor 304 sends the encoded message to a display. The display may be one of overhead display 102, wall mounted display 104, and seat back display 106. In various embodiments, the encoded message may be sent to all displays within aircraft interior 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   detecting, by a processor, a signal received from a camera, the signal including an image;
   processing, by the processor, the signal to identify the image included in the signal;
   determining, by the processor, that the signal includes an encoded discreet message, the encoded discreet message embedded within a portion of the image, the encoded discreet message defined by a pixel array having a plurality of adjusted pixels, each adjusted pixel of the plurality of adjusted pixels emitting a non-visible wavelength of light to provide the encoded discreet message;

decrypting, by the processor, the encoded discreet message embedded within the signal thereby forming a decrypted message; and sending, by the processor, the decrypted message to be displayed.

2. The method of claim 1, wherein the signal from the camera includes video.

3. The method of claim 1, wherein the encoded discreet message is steganographically encrypted in the image.

4. The method of claim 1, further comprising:
identifying, by the processor, a key frame indicating a presence of the encoded discreet message.

5. The method of claim 1, further comprising:
identifying, by the processor, a recipient device for the encoded discreet message; and
sending, by the processor, the encoded discreet message to the recipient device.

6. A system for discreet communication, comprising:
a camera;
a display;
a processor; and
a memory coupled to the processor, the memory comprising instructions when executed by the processor cause the processor to:
receive a signal from the camera, the signal including an image;
process the signal from the camera to determine a presence of the image;
determine that there is encoded discreet message embedded in the signal, the encoded discreet message embedded within a portion of the image, the encoded discreet message defined by a pixel array having a plurality of adjusted pixels, each adjusted pixel of the plurality of adjusted pixels emitting a non-visible wavelength of light to provide the encoded discreet message encoding for the discreet message;
decrypt the encoded discreet message from the signal in response to the determination that the encoded discreet message is present in the signal thereby forming a decrypted discreet message; and
display the decrypted discreet message on the display.

7. The system for discreet communication of claim 6, wherein the signal further includes a video.

8. The system for discreet communication of claim 6, wherein the instructions when executed by the processor further cause the processor to:
determine the encoded discreet message is embedded using steganography.

9. The system for discreet communication of claim 6, wherein the display is a crew display.

10. The system for discreet communication of claim 6, wherein the display is one of a watch, a phone, a tablet, and an augmented reality glasses.

11. The system for discreet communication of claim 6, wherein the instructions when executed by the processor further cause the processor to:
determine a second display for displaying the decrypted discreet message; and
send the decrypted discreet message to the second display.

12. The system for discreet communication of claim 6, wherein the encoded discreet message includes biometric data including at least one of a temperature, a heart rate, and passenger state of consciousness.

13. The system for discreet communication of claim 6, wherein the encoded discreet message includes personalized information for a passenger to view.

14. A method, comprising:
receiving, by a processor, a message to display in an aircraft;
encrypting, by the processor, the message for display, wherein the message is encrypted by adjusting a plurality of pixels in a pixel array in a portion of an image to emit a non-visible wavelength of light to provide an encrypted message; and
sending, by the processor, a signal including the encrypted message, the signal is sent to a display in the aircraft.

15. The method of claim 14, wherein the encrypting the message includes steganographically encrypting the message.

16. The method of claim 14, further comprising:
determining, by the processor, the display to which the signal is sent.

17. The method of claim 14, further comprising:
identifying, by the processor, a recipient device on the aircraft to which the encrypted message is sent.

* * * * *

UNITED STATES PATENT AND TRADEMARK OFFICE
CERTIFICATE OF CORRECTION

Page 1 of 1

PATENT NO. : 12,375,616 B2
APPLICATION NO. : 17/857823
DATED : July 29, 2025
INVENTOR(S) : Jose-Rodrigo Castillo-Garza et al.

It is certified that error appears in the above-identified patent and that said Letters Patent is hereby corrected as shown below:

In the Claims

Column 9, Claim 6 Lines 39/40 delete "encoding for the discreet message"

Signed and Sealed this
Twenty-first Day of October, 2025

John A. Squires
*Director of the United States Patent and Trademark Office*